United States Patent
Kazawa et al.

(10) Patent No.: US 8,903,650 B2
(45) Date of Patent: Dec. 2, 2014

(54) NAVIGATION DEVICE, METHOD FOR DISPLAYING ICON, AND NAVIGATION PROGRAM

(71) Applicant: Alpine Electronics, Inc., Tokyo (JP)

(72) Inventors: Akira Kazawa, Iwaki (JP); Satoru Kono, Iwaki (JP); Mitsunori Koyatsu, Iwaki (JP); Masahiro Kida, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 3 days.

(21) Appl. No.: 13/951,892

(22) Filed: Jul. 26, 2013

(65) Prior Publication Data

US 2014/0107917 A1    Apr. 17, 2014

(30) Foreign Application Priority Data

Oct. 16, 2012    (JP) .............................. 2012-228962

(51) Int. Cl.
*G01C 21/00* (2006.01)
*G01C 21/36* (2006.01)

(52) U.S. Cl.
CPC ........ *G01C 21/3644* (2013.01); *G01C 21/3682* (2013.01); *G01C 21/3632* (2013.01)
USPC ....................................................... 701/426

(58) Field of Classification Search
CPC ........... G01C 21/3632; G01C 21/3682; G01C 21/3685; G01C 21/3694; G01C 21/343; G01C 21/3667; G01C 21/3676; G01C 21/3644; G08G 1/096827; G08G 1/096838; G08G 1/096866; G08G 1/096883

USPC ......... 701/426, 428, 431, 438, 455, 462, 454, 701/461, 301; 340/995.24, 995.27

See application file for complete search history.

(56) References Cited

U.S. PATENT DOCUMENTS

2009/0018764 A1    1/2009 Ishibashi et al.
2009/0177383 A1*   7/2009 Tertoolen ...................... 701/208
2010/0026526 A1*   2/2010 Yokota .......................... 340/996

FOREIGN PATENT DOCUMENTS

JP         10-30931       2/1998
JP         2003-177028    6/2003

* cited by examiner

*Primary Examiner* — Gertrude Arthur Jeanglaude
(74) *Attorney, Agent, or Firm* — Brinks Gilson & Lione

(57) ABSTRACT

A navigation device includes an icon display unit for displaying icons representing predetermined display objects located on a predetermined road ahead of the current location in an elongated display area of a display unit in a linear fashion along a length direction of the display area preferentially in order of proximity to the current location and a predefined distance display unit for displaying an image indicating the predefined distance from the current location in the display area when the icons are displayed. The icon display unit stationarily displays the icons representing display objects located farther than the predefined distance from the current location and movably displays an icon representing a display object located within the predefined distance so that the icon moves towards the current location in accordance with the movement of the current location.

25 Claims, 10 Drawing Sheets

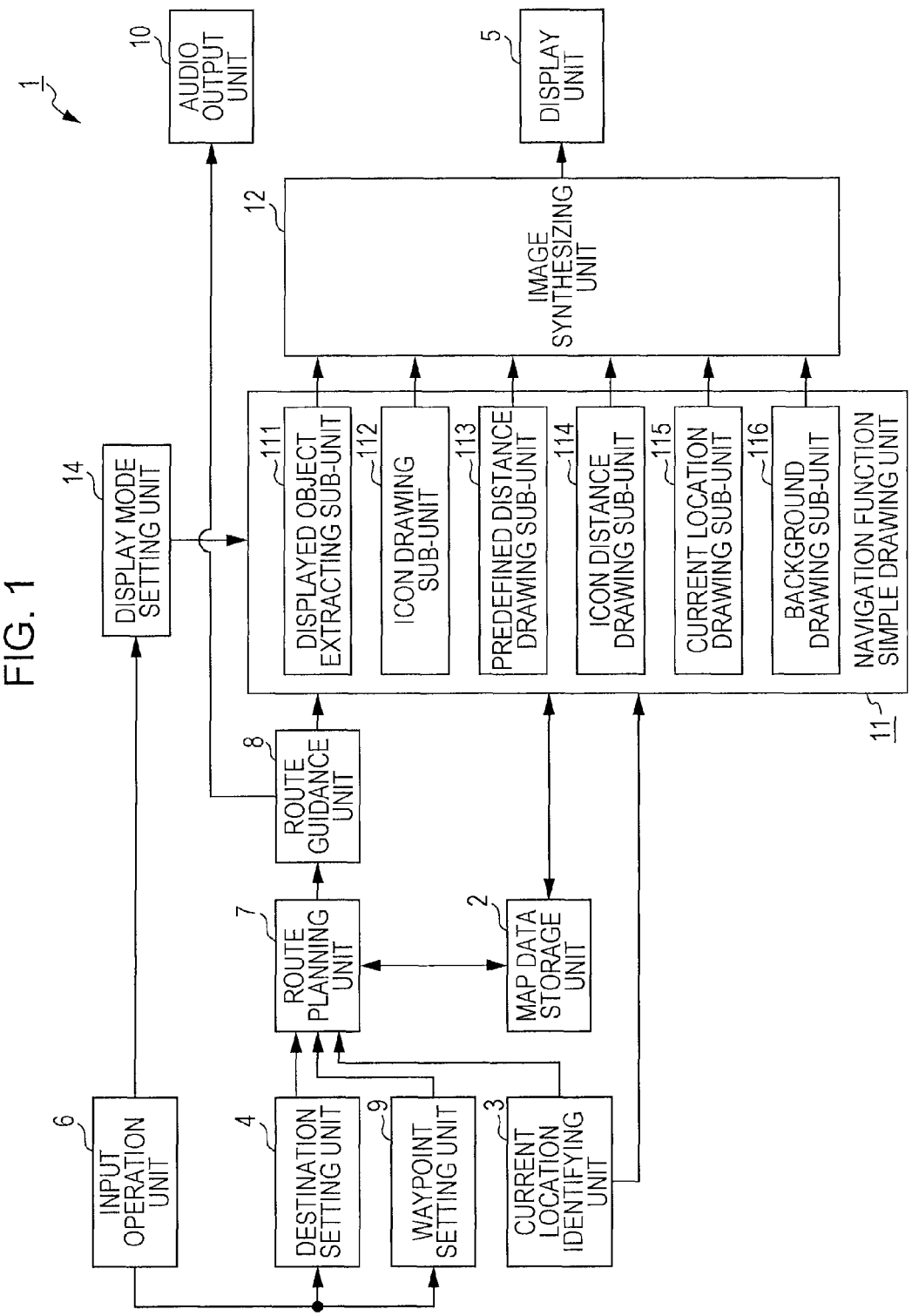

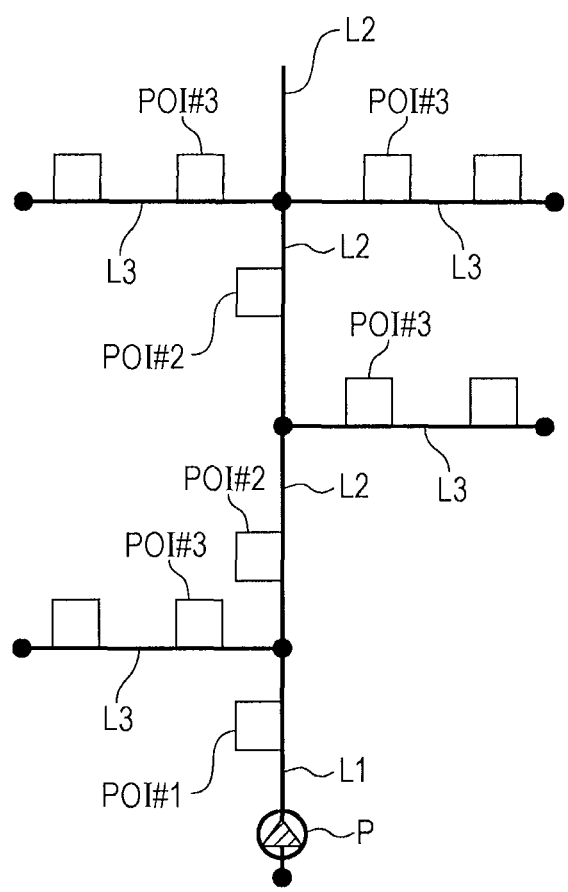

NAVIGATION DEVICE, METHOD FOR DISPLAYING ICON, AND NAVIGATION PROGRAM

RELATED APPLICATION

The present application claims priority to Japanese Patent Application Number 2012-228962, filed Oct. 16, 2012, the entirety of which is hereby incorporated by reference.

BACKGROUND

1. Field of the Invention

The present invention relates to a navigation device, a method for displaying an icon, and a navigation program and, in particular, to a navigation device, a method for displaying an icon, and a navigation program suitable for providing information regarding navigation functions in a simple display format.

2. Description of the Related Art

Some existing electronic apparatuses, such as equipment mounted in a vehicle and a mobile terminal, have a navigation function (application software) for giving route guidance along an optimum route to a destination to users.

Examples of the navigation function include displaying a map of the surroundings on a display unit, highlighting an image indicating a guide route on the map when navigation is activated, displaying, on the map, a point of interest (POI) specified by a user and appearing in the area near the current location, and expanding an image indicating a traffic intersection to be guided through.

SUMMARY

In some cases, a display process of the navigation function needs to be performed for a limited display space.

For example, while a user is watching an audio/visual screen, such as one of playback screens of a TV program, a DVD movie, and music, the user may want to view a navigation screen without degrading the viewability. Alternatively, a user may attempt to use a navigation function using a device having a small screen.

Japanese Unexamined Patent Application Publication No. 2003-177028 describes a technology for displaying, for example, a waypoint (an intermediate destination) on a route, the destination, and an intersection in a linear fashion to form a route map. By using such a technology, the display space can be reduced to some degree.

However, although the technology described in Japanese Unexamined Patent Application Publication No. 2003-177028 allows a user to view guide points on a route in the limited display space, it is difficult for the user to get a real-life impression.

Accordingly, it is an object of embodiments of the present invention to provide a navigation device, a method for displaying an icon, and a navigation program for reducing a display space and allowing a user to have a real-life impression.

According to an embodiment of the present invention, a navigation device for giving route guidance to a set destination includes an icon display unit configured to display, on the basis of data regarding predetermined display objects located on a predetermined road ahead of the current location identified by the current location identifying unit, icons representing the display objects in a predetermined belt-like, or elongated, display area of a display unit in a linear fashion along a length direction of the display area preferentially in order of proximity to the current location, and a predefined distance display unit configured to display an image indicating the predefined distance at a position corresponding to the predefined distance from the identified current location in the display area when the icons are displayed by the icon display unit. The icon display unit stationarily displays the icons indicating the display objects located farther than the predefined distance from the current location in a region of the display area corresponding to a road range outside the predefined distance until one of the display objects closest to the current location moves to within the predefined distance in accordance with the movement of the current location. The icon display unit movably displays the icon indicating the display object located within the predefined distance from the identified current location in a region of the display area corresponding to a road range within the predefined distance so that the icon moves towards the current location in accordance with the movement of the current location.

According to another embodiment of the present invention, a method for displaying an icon indicating a predetermined display object located on a road includes a first step of identifying a current location and a second step of displaying, on the basis of data regarding predetermined display objects located on a predetermined road ahead of the current location identified in the first step, icons representing the display objects in a predetermined belt-like display area of a display unit in a linear fashion along a length direction of the display area preferentially in order of proximity to the current location, and displaying an image indicating the predefined distance at a position corresponding to the predefined distance from the identified current location in the display area. The second step further involves stationarily displaying the icons indicating the display objects located farther than the predefined distance from the current location in a region of the display area corresponding to a road range outside the predefined distance until one of the display objects closest to the current location moves to within the predefined distance in accordance with the movement of the current location and movably displaying the icon indicating the display object located within the predefined distance from the identified current location in a region of the display area corresponding to a road range within the predefined distance so that the icon moves towards the current location in accordance with the movement of the current location.

According to still another embodiment of the present invention, a navigation program capable of giving route guidance to a set destination is provided. The navigation program includes program code for causing a computer to function as an icon display unit configured to display, on the basis of data regarding predetermined display objects located on a predetermined road ahead of a current location identified by a current location identifying unit, icons representing the display objects in a predetermined belt-like display area of a display unit in a linear fashion along a length direction of the display area preferentially in order of proximity to the current location, and a predefined distance display unit configured to display an image indicating the predefined distance at a position corresponding to the predefined distance from the identified current location in the display area when the icons are displayed by the icon display unit. The icon display unit stationarily displays the icons indicating the display objects located farther than the predefined distance from the current location in a region of the display area corresponding to a road range outside the predefined distance until one of the display objects closest to the current location moves to within the predefined distance in accordance with the movement of the current location, and the icon display unit movably displays the icon indicating the display object located within the predefined distance from the identified current location in a region of the display area corresponding to a road range within the predefined distance so that the icon moves towards the current location in accordance with the movement of the current location.

According to an embodiment of the present invention, icons indicating display objects located on a road ahead of the current location can be displayed in a belt-like display area in a linear fashion preferentially in order of proximity to the current location, and an icon indicating the display object located within a predefined distance from the identified current location can be movably displayed so that the icon moves towards the current location in accordance with the movement of the current location. Accordingly, the navigation function can be provided in a simplified display format using a narrow display space. In addition, unlike a display object located far from the current location and having an icon stationarily displayed, the icon of a display object close to the current location is movably displayed. Thus, the user expects that the display object located close to the current location will come into view soon. In this manner, a user can get a real-life impression.

In addition, the navigation device of an embodiment of the present invention may set a non-guidance time POI display mode in which a POI icon indicating a POI set as a POI having an icon to be displayed is displayed in a background in which the route guidance is not given, and the icon display unit may display the POI icon indicating the POI to be displayed in a current link having the current location therein, the POI icon indicating the POI to be displayed in a subsequent link that follows the current link in a straight ahead direction, and the POI icon indicating the POI to be displayed in a branch link which branches from a connection point of the current location link and the subsequent link or at a connection point of two neighboring subsequent links and located near the current location. Similarly, the method for displaying an icon according to an embodiment of the present invention may further include a third step of setting a non-guidance time POI display mode in which a POI icon indicating a POI set as a POI having an icon to be displayed is displayed in a background in which the route guidance is not given, and the second step may involve displaying the POI icon indicating the POI to be displayed in a current link having the current location therein, the POI icon indicating the POI to be displayed in a subsequent link that follows the current link in a straight ahead direction, and the POI icon indicating the POI to be displayed in a branch link which branches from a connection point of the current location link and the subsequent link or at a connection point of two neighboring subsequent links and located near the current location.

Such a configuration allows the icons of the POI to be displayed on a road ahead of the current location to be displayed in a linear fashion in order of proximity to the current location even when route guidance is not given in a background (even when the vehicle is traveling without any guidance). In addition, the icon indicating the display object located within the predefined distance from the identified current location can be movably displayed so that the icon moves towards the current location in accordance with the movement of the current location.

Furthermore, the navigation device of an embodiment of the present invention may selectably set the guidance time POI display mode in which a POI icon indicating a POI having an icon to be displayed is displayed when the route guidance is given in a background and a route guidance mode in which a route guidance screen is actually displayed. The icon display unit may display the POI icon indicating the POI to be displayed located on the guide route as the icon when the guidance time POI display mode is set and displays a guide point icon indicating a guide point located on the guide route as the icon when the route guidance mode is set. Similarly, the method for displaying an icon according to an embodiment of the present invention may further include a fourth step of selectably setting a guidance time POI display mode in which a POI icon indicating a POI having an icon to be displayed is displayed when the route guidance is given in a background and a fifth step of selectively setting a route guidance mode in which a route guidance screen is actually displayed. The second step may include a first sub-step of displaying the POI icon indicating the POI to be displayed located on the guide route as the icon when the guidance time POI display mode is set and a second sub-step of displaying a guide point icon indicating a guide point located on the guide route as the icon when the route guidance mode is set.

Such a configuration allows the icons of the POI to be displayed on a road ahead of the current location to be displayed in a linear fashion in order of proximity to the current location when route guidance is given in a background. In addition, the icon indicating the display object located within a predefined distance from the current location can be movably displayed so that the icon moves towards the current location in accordance with the movement of the current location.

Still furthermore, the navigation device according to an embodiment of the present invention may display a destination icon indicating the destination located on the guide route as the icon when the route guidance mode is set. Similarly, according to the method for displaying an icon, the second sub-step may involve displaying a destination icon indicating the destination located on the guide route together with the guide point icon.

Such a configuration can provide route guidance with the icon of the destination displayed using a narrow display space and provide a real-life impression to the user.

In the navigation device according to an embodiment of the present invention, the icon display unit may display a waypoint icon indicating a waypoint located on the guide route as the icon when the route guidance mode is set. Similarly, in the method for displaying an icon, the second sub-step may involve displaying a waypoint icon indicating a waypoint located on the guide route together with the guide point icon.

Such a configuration can provide route guidance with the icon of the waypoint displayed using a narrow display space and provide a real-life impression to the user.

Still furthermore, the navigation device according to an embodiment of the present invention may further include a waypoint setting unit. If the guidance time POI display mode is set, the icon display unit may display the POI icon so that the POI icon is selectable through a one-touch operation on a touch panel, and the waypoint setting unit may set a POI corresponding to the POI icon selected by the one-touch operation as a waypoint which is to be passed through before the destination of the guide route is reached. Similarly, in the method for displaying an icon, the first sub-step may involve displaying the POI icon so that the POI icon is selectable as a waypoint through the one-touch operation on a touch panel.

Such a configuration allows the user to easily and promptly set a waypoint from among the icons of POIs to be displayed. In this manner, the operability and the usability can be increased.

Still furthermore, in the navigation device according to an embodiment of the present invention, if the POI icon corresponding to the POI set as the waypoint is selected again by the one-touch operation, the waypoint setting unit may remove the setting that specifies the POI as the waypoint. Similarly, the method for displaying an icon may further include a sixth step of displaying the POI icon corresponding to the POI set as the waypoint by a one-touch operation so that the setting that specifies the POI as the waypoint is removable by a new one-touch operation.

Such a configuration allows the user to easily and promptly remove the setting that specifies a POI to be displayed as a waypoint. In this manner, the operability and the usability can be increased more.

Still furthermore, the navigation device according to an embodiment of the present invention may further include a destination setting unit. The icon display unit may display the POI icon so that the POI icon is selectable through a one-touch operation on a touch panel when the non-guidance time POI display mode is set, and the destination setting unit may set a POI corresponding to the POI icon selected by the one-touch operation as the destination. Similarly, in the method for displaying an icon, the second step may involve displaying the POI icon so that the POI icon is selectable as the destination through a one-touch operation on a touch panel when the non-guidance time POI display mode is set.

Such a configuration allows the user to easily and promptly perform a destination setting operation for a POI to be displayed (i.e., an operation to start route guidance). In this manner, the operability and the usability can be increased.

Still furthermore, in the navigation device according to an embodiment of the present invention, if the POI icon corresponding to the POI set as the destination is selected by the one-touch operation, the destination setting unit may remove the setting that specifies the POI as the destination. Similarly, the method for displaying an icon may further include a seventh step of displaying the POI icon corresponding to the POI set as the destination by the one-touch operation so that the POI icon is selectable by a new one-touch operation to remove the setting that specifies the POI as the destination.

Such a configuration allows the user to easily and promptly perform a destination setting removal operation for a POI to be displayed (i.e., an operation to stop route guidance). In this manner, the operability and the usability can be increased.

Still furthermore, the navigation device according to an embodiment of the present invention may further include a distance display unit configured to display distance information regarding a distance from the current location to the display object in association with the icon. Similarly, in the method for displaying an icon, the second step may further involve displaying distance information regarding a distance from the current location to the display object in association with the icon.

Such a configuration allows the icon of a display object to be displayed together with the distance from the current location to the display object. Thus, the reliability of the order of arrangement of the icons can be increased.

Still furthermore, in the navigation device according to an embodiment of the present invention, the distance display unit may change a display format of the distance information corresponding to the display object set as one of the destination and the waypoint from a display format of the distance information corresponding to the display object that is set as neither a destination nor a waypoint. Similarly, in the method for displaying an icon, the second step may further involve changing a display format of the distance information corresponding to the display object set as one of the destination and the waypoint from a display format of the distance information corresponding to the display object that is set as neither a destination nor a waypoint.

Such a configuration allows the user to easily recognize the waypoint or the destination together with its distance from among the icons of the display objects displayed in a linear fashion. In this manner, the usability can be increased.

Still furthermore, the navigation device according to an embodiment of the present invention may further include a current location display unit. One end of the display area in a length direction of the display area may correspond to the current location, and the current location display unit may display a current location icon indicating the current location at the end of the display area. Similarly, in the method for displaying an icon, one end of the display area in a length direction of the display area may correspond to the current location, and the second step may further involve displaying a current location icon indicating the current location at the end of the display area.

Such a configuration allows the user to more clearly recognize the positional relationship between a display object ahead of the current location and the current location.

Still furthermore, in the navigation device according to an embodiment of the present invention, the display area may be placed in an end portion of an entire display area of the display unit. Similarly, in the method for displaying an icon, the display area may be placed in an end portion of an entire display area of the display unit.

Such a configuration meets the need for using most of the display area for functions other than the navigation function and using the remaining small area for a simple display format of the navigation function.

Still furthermore, in the navigation device according to an embodiment of the present invention, when an audio/visual screen is displayed as a full screen and if a predetermined operation is performed, the icon display unit may display the icon in the display area set in the end portion of the audio/visual screen. Similarly, in the method for displaying an icon, the second step may involve displaying the icon in the display area set in the end portion of the audio/visual screen displayed as a full screen in response to a predetermined operation.

Such a configuration meets the user need for using the navigation function while continuously viewing the audio/visual screen.

Still furthermore, in the navigation device according to an embodiment of the present invention, the predefined distance display unit may display a line indicating the predefined distance such that the line extends in a direction perpendicular to the length direction of the display area. Similarly, in the method for displaying an icon, the second step may involve displaying a line indicating the predefined distance such that the line extends in a direction perpendicular to the length direction of the display area.

Such a configuration allows the user to easily recognize a predefined distance ahead of the current location using a simplified display format.

According to the present invention, a navigation device, a method for displaying an icon, and a navigation program for reducing a display space and providing a real-life impression can be provided.

BRIEF DESCRIPTION OF THE DRAWINGS

FIG. 1 is a block diagram of a navigation device according to an embodiment of the present invention;

FIG. 2 illustrates POIs to be displayed when a non-guidance time POI display mode is set;

DESCRIPTION OF THE PRESENTLY PREFERRED EMBODIMENTS

Navigation Device

Figure 3A:
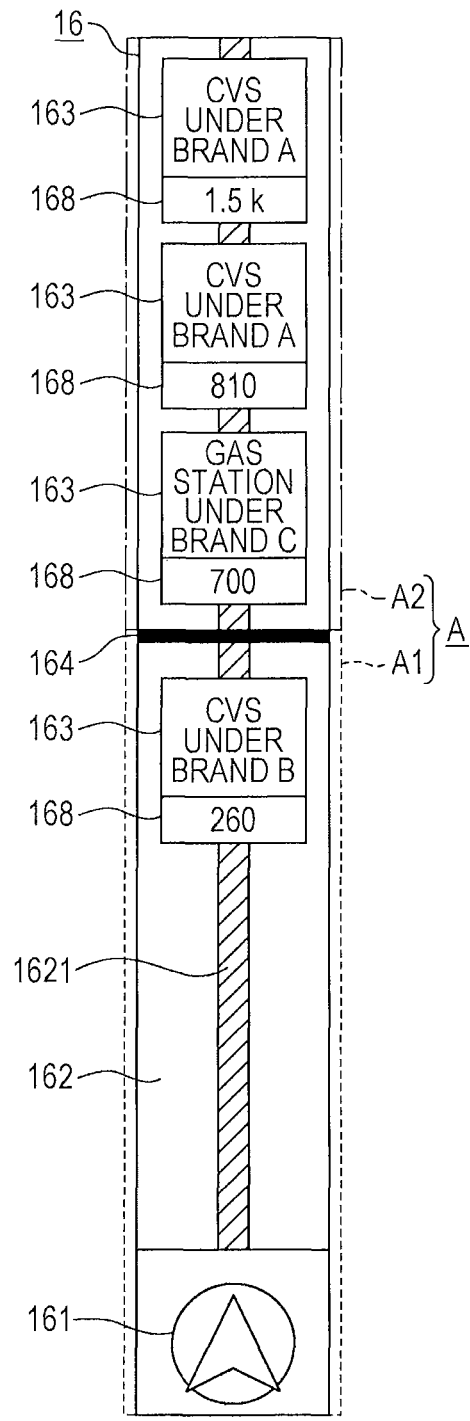
FIGS. 3A and 3B illustrate an example of icons displayed in the non-guidance time POI display mode.

A navigation device according to an exemplary embodiment of the present invention is described below with reference to FIGS. 1 to 7.

As illustrated in FIG. 1, according to the present exemplary embodiment, a navigation device 1 includes a map data storage unit 2 that prestores map data. The map data includes data used to display an icon indicating a POI (hereinafter referred to as a "POI icon") and data used for route planning, route guidance, and searching for a destination or a waypoint (an intermediate destination). The data used for displaying a POI icon may contain the name of the POI, the location (the longitude and latitude) of the POI, a link ID associated with the POI, the address, the type, and the icon image. The data used for route planning may contain the node data, the link record, a regulation record, the cost record between links, the link ID, the cost for the link, information for identifying a higher node link, and the coordinates of the node. The data used for route guidance may contain the name, the position, and the exit direction of a guide point (e.g., an intersection or a junction in the road). The data used to search for a destination/waypoint may contain the name, the position, the address, the ZIP code, the phone number, and the type of a point (including a POI). Note that the map data storage unit 2 may be a hard disk drive or a variety of types of flash memory. Alternatively, part or the entirety of the map data storage unit 2 may be mounted in the device body (in-car equipment or a mobile terminal) or a server that can perform data communication with the device body via an external network (e.g., the Internet).

In addition, as illustrated in FIG. 1, the navigation device 1 includes a current location identifying unit 3 mounted in the device body as a current location identifying unit. The current location identifying unit 3 identifies the current location (the current position) of the navigation device 1. The current location identifying unit 3 may employ a satellite navigation technique for determining the current location using the absolute coordinates on the basis of a positioning signal received by a satellite navigation receiver, such as a GPS receiver. Alternatively, an autonomous navigation technique for determining the current location as a relative location, which is a displacement from the previous location, using an autonomous navigation sensor, such as a gyro sensor or a vehicle speed sensor, may be employed. Still alternatively, a hybrid navigation technique, which is a combination of the satellite navigation technique and the autonomous navigation technique, may be employed. In addition, the current location identifying unit 3 may more accurately identify the current location by performing a map matching process for correcting the current location identified through the satellite navigation technique or the autonomous navigation technique using the map data stored in the map data storage unit 2. Note that the current location identifying unit 3 may be realized by an arithmetic processing unit (e.g., a central processing unit (CPU)) that executes a program for realizing such a function. The program to be executed by the arithmetic processing unit can be stored in a program storage unit, such as a read only memory (ROM). In addition, during processing performed by the arithmetic processing unit, a work space such as a random access memory (RAM) may be used.

In addition, as illustrated in FIG. 1, the navigation device 1 includes a destination setting unit 4 in the device body. The destination setting unit 4 displays, on the display unit 5, an operation screen for setting a destination for a navigation purpose and, subsequently, sets the destination in accordance with information input from the user to the operation screen through the input operation unit 6. Note that the operation screen for setting a destination may include an icon 163 of a POI to be displayed in a non-guidance time POI display mode (described in more detail below). The input operation unit 6 may be a remote control unit, a touch panel of the display unit 5, or a microphone for receiving voice. Alternatively, the destination setting unit 4 may be realized by the arithmetic processing unit that executes a program for realizing such a function.

In addition, as illustrated in FIG. 1, the navigation device 1 includes a waypoint setting unit 9 in the device body. The waypoint setting unit 9 displays an operation screen for setting a waypoint used for navigation on the display unit 5 and, subsequently, sets a waypoint in accordance with information input from the user to the operation screen through the input operation unit 6. Note that the operation screen for setting a waypoint may include an icon 163 of a POI to be displayed in a guidance time POI display mode (described in more detail below).

In addition, as illustrated in FIG. 1, the navigation device 1 includes a route planning unit 7. If a destination is set by the destination setting unit 4, the route planning unit 7 plans an optimum route under a preset route planning condition as a route to the set destination using a route calculation technique, such as Dijkstra's Algorithm. At that time, if a waypoint is set by the waypoint setting unit 9, the route planning unit 7 plans a route to the destination that passes through the set waypoint. Thereafter, the route planning unit 7 presents the planned route to the user by displaying the information on the display unit 5. Note that the route planning unit 7 may be realized by the arithmetic processing unit that executes a program for realizing such a function. The route planning unit 7 may be disposed in the device body or a server.

In addition, as illustrated in FIG. 1, the navigation device 1 includes a route guidance unit 8 in, for example, the device body. If the user performs an input operation to set the route presented by the route planning unit 7 as a guidance route, the route guidance unit 8 sets the presented route as the guidance route. Thereafter, the route guidance unit 8 gives route guidance along the set guidance route. The route guidance may be given by displaying a guide point icon, a waypoint icon, and a destination icon in a simple display format (described in more detail below) and offering voice guidance indicating a right or left turn at an intersection through an audio output unit 10. Note that the route guidance unit 8 may be realized by the arithmetic processing unit that executes a program for realizing such a function.

In addition, as illustrated in FIG. 1, the navigation device 1 includes a navigation function simple drawing unit 11 in the device body.

The navigation function simple drawing unit 11 is described in detail below. As illustrated in FIG. 1, the navigation function simple drawing unit 11 includes a display object extracting sub-unit 111. The display object extracting sub-unit 111 extracts a predetermined display object on a predetermined road ahead of the current location identified by the current location identifying unit 3 on the basis of the map data.

In addition, as illustrated in FIG. 1, the navigation function simple drawing unit 11 includes an icon drawing sub-unit 112 serving as an icon display unit. The icon drawing sub-unit 112 generates drawing data for displaying icons representing predetermined display objects on a predetermined road (i.e., an object located alongside the road or an object facing the road) ahead of the current location identified by the current location identifying unit 3 in a predetermined belt-like display area of the display unit 5. The icons are displayed in a linear fashion in the length direction of the belt-like display area preferentially in order of proximity to the current location. The term "preferentially" is used herein to mean that when the number of display objects ahead of the current location is large and if it is difficult to display all of the objects in the space of the display area at the same time, the icons of some, but not all, of the display objects are preferentially selected to be displayed. Such limitation may be achieved by, when the display objects are extracted by the display object extracting sub-unit 111, limiting the number of display objects to be extracted so that a certain number of the display objects closer to the current location are preferentially extracted. Alternatively, when the icons of the display objects are drawn by the icon drawing sub-unit 112, limitation of the number of icons to be displayed is set so that a certain number of icons of the display objects closer to the current location are preferentially drawn.

In addition, as illustrated in FIG. 1, the navigation function simple drawing unit 11 includes a predefined distance drawing sub-unit 113. When the icon drawing sub-unit 112 generates drawing data (i.e., when the icons of the display objects are displayed), the predefined distance drawing sub-unit 113 generates drawing data for creating, in the display area, an image indicating a predefined distance from the position indicating the current location. At that time, the predefined distance may be a fixed value, such as 300 m, or a variable value that can be specified or modified through the input operation unit 6.

The drawing data is generated by the icon drawing sub-unit 112 for one of the following two types of icon: a stationary icon and a movable icon.

(1) Stationary Icon

The icon of an object located farther away than the predefined distance from the current location identified by the current location identifying unit 3 is displayed at a fixed position in a display region of the display area for an icon located farther away from the predefined distance until one of display objects that is the closest to the current location among the display objects (or a single display object) moves to within the predefined distance in accordance with the movement of the current location. The words "being displayed at a fixed position until the display object moves to within the predefined distance" also means that if a condition that moves the icon to within the predefined distance occurs, the display positions of the icons change in the region for an icon that is farther away than the predefined distance. That is, the icon is movably displayed. However, unlike the following type (2) of icon whose display position is continuously changed, the display position of this type of icon is intermittently changed. Accordingly, from the viewpoint of the viewer, an icon of the type (1) seems to be stationary (fixed at a certain position), as compared with an icon of the type (2).

(2) Movable Icon

The icon indicating a display object located within the predefined distance from the current location identified by the current location identifying unit 3 is movably displayed so as to move toward the current location in accordance with the movement of the current location.

In addition, as illustrated in FIG. 1, the navigation function simple drawing unit 11 includes an icon distance drawing sub-unit 114. The icon distance drawing sub-unit 114 generates drawing data used for displaying information indicating the distance from the current location to the display object together with the icon of the display object.

In addition, as illustrated in FIG. 1, the navigation function simple drawing unit 11 includes a current location drawing sub-unit 115 serving as a current location display unit. One end of the display area in the length direction corresponds to the current location. The current location drawing sub-unit 115 generates drawing data used for displaying a current location icon indicating the current location at the one end of the display area.

In addition, as illustrated in FIG. 1, the navigation function simple drawing unit 11 includes a background drawing sub-unit 116. The background drawing sub-unit 116 generates drawing data used for displaying a background image including an image resembling a road in the display area.

The navigation function simple drawing unit 11 providing the above-described functions may be realized by a program running on the arithmetic processing unit.

In addition, as illustrated in FIG. 1, the navigation device 1 includes an image synthesizing unit 12. The image synthesizing unit 12 synthesizes drawing data items generated by the icon drawing sub-unit 112, the predefined distance drawing sub-unit 113, the icon distance drawing sub-unit 114, and the current location drawing sub-unit 115 of the navigation function simple drawing unit 11 to generate drawing data and outputs the drawing data to the display unit 5. In this manner, an image generated by synthesizing the drawing data items is displayed. The image synthesizing unit 12 may be formed from, for example, a video RAM (VRAM).

In addition, as illustrated in FIG. 1, the navigation device 1 includes a display mode setting unit 14. The display mode setting unit 14 selectively sets a display mode in accordance with an operation performed on the input operation unit 6 in the navigation function simple drawing unit 11.

The navigation function simple drawing unit 11 performs a drawing process corresponding to the display mode selected from among the following variety of display modes.

Non-Guidance Time POI Display Mode Setting

More specifically, the display mode setting unit 14 can set a non-guidance time POI display mode. In the non-guidance time POI display mode, a POI icon which indicates a POI to be displayed (a display object) is displayed without route guidance in the background. The words "without route guidance in the background" refers to a mode in which route guidance is not given in the background (a back screen or a hidden screen). If route guidance is given in the background, switching to a route guidance mode (described below) can be performed at any time. In the non-guidance time POI display mode, the current location of the device is moving forward due to the movement of the vehicle. Note that the POI to be displayed may be set in an initial setting through the input operation unit 6.

When the non-guidance time POI display mode is set, the icon drawing sub-unit 112 generates the drawing data for displaying the icons of the following POI (a) to (c) to be displayed in a linear fashion:

(a) a POI to be displayed that is located in a current location link L1 which includes a current location P therein, as illustrated in FIG. 2 (POI #1), (b) a POI to be displayed that is located in any one of several subsequent links L2 that follow the current location link L1 in a straight ahead direction, as illustrated in FIG. 2 (POI #2), and (c) a POI to be displayed that is located in a branch link L3 which branches from the straight ahead direction at a connection point of the current location link L1 and the subsequent links L2 (a node) or at a connection point of two neighboring subsequent links L2 and that is located near the current location, as illustrated in FIG. 2 (POI #3).

Note that like a POI located on a curve of a road, a POI located on one of the current location link L1 and the subsequent links L2 and a branch link L3 at the same time can be considered as a single POI located at one of the two links in order to prevent the POI from being duplicately displayed.

Figure 3B:
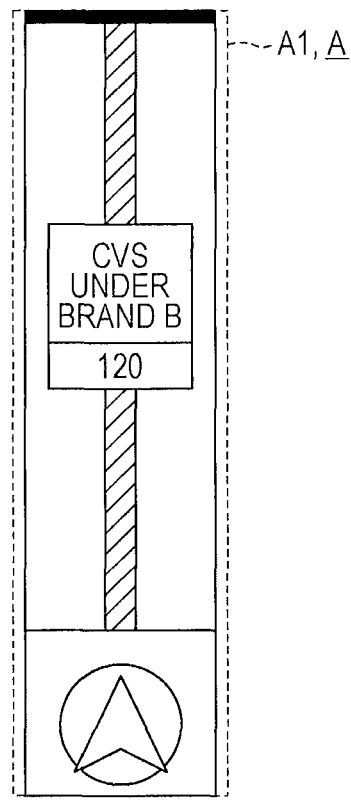

FIGS. 3A and 3B illustrate an example of an image 16 displayed in a display area A when the non-guidance time POI display mode is set.

In FIG. 3A, a current location icon 161 (a vehicle position mark) is displayed at the lower end of the belt-like display area A extending in the vertical direction. In addition, icons 163 of POIs to be displayed are displayed above the current location icon in a linear fashion in a background image 162 including a vertically long image 1621 that represents a road. In addition, each of the icons 163 has distance information 168 affixed thereto. The distance information 168 indicates the distance of the POI to be displayed from the current location.

Furthermore, a line 164 is displayed at a position corresponding to the predefined distance from the current location in the display area A so as to be perpendicular to the length direction of the display area A.

A display state of the icons 163 is described in more detail below. As illustrated in FIG. 3A, the icon 163 of the POI (a convenience store (CVS) under a brand "B") displayed in a region A1 (hereinafter referred to as a "first region A1") of the display area A within the predefined distance is disposed at a position corresponding to a distance between the current location and the POI in the first region A1. The position at which the icon 163 is to be displayed in the first region A1 may be determined on the basis of, for example, a correspondence between a pixel (Y coordinate) range of the first region A1 and a distance between the current location and the POI to be displayed in the map data based on the length of a link and a correspondence between the pixel range and the predefined distance.

In contrast, as illustrated in FIG. 3A, a certain number of icons 163 (three in FIG. 3A) of POIs to be displayed (i.e., a gas station under a brand "C" and CVSs under the brand "A") are displayed in a region A2 of the display area A that is farther than the predefined distance (hereinafter referred to as a "second region A2"). The icons 163 are stationarily displayed in the second region A2 in order of proximity to the current location.

Subsequently, if the current location moves from the position illustrated in FIG. 3A, the display state of the first region A1 changes as illustrated in FIG. 3B. That is, since the current location approaches the POI to be displayed, the icon 163 of the to-be-displayed POI displayed in the first region A1 of FIG. 3A is moved towards the current location icon 161 by a distance corresponding to an approach distance. In addition, the distance information 168 indicating the distance between the current location and the POI is reduced by the approach distance. At that time, the distance information 168 displayed in the second region A2 is changed in the same manner as in the first region A1.

The display positions of the icons 163 in the second region A2 are not changed if one of the to-be-displayed POIs located closest to the current location whose icon is displayed in the second region A2 does not move within the predetermined distance despite the advancing of the current location. However, if the POI located closest to the current location moves within the predefined distance, the display positions are changed. That is, the icon of the POI located closest to the current location is shifted into the first region A1 and, thus, the display space for the icon becomes empty. To fill the space with a new icon, the display positions of the icons displayed in the second region A2 (except for the icon closest to the current location) are shifted towards the current location by one icon display space. In addition, one of the icons of the POIs to be displayed at the far side is added to the upper most icon display space in the second region A2. After the display state is changed in such a manner, the display positions of the icons in the second region A2 remain unchanged until the new to-be-displayed POI closest to the current location moves within the predefined distance.

Note that the icons 163 may be displayed so as to be selectable using a one-touch operation performed on the touch panel. In such a case, the destination setting unit 4 may immediately select, as the destination, the to-be-displayed POI corresponding to the icon 163 selected by a one-touch operation. As used herein, the term "immediately" means "without any other operation". In such a case, the route planning unit 7 plans the route to the destination and, subsequently, the route guidance given by the route guidance unit 8 may be started in the background or foreground. Alternatively, such a one touch operation performed on the touch panel may instruct the display mode setting unit 14 to disable the currently set non-guidance time POI display mode and newly set the guidance time POI display mode (described in more detail below) or a route guidance mode (described in more detail below).

Guidance Time POI Display Mode Setting

In addition, the display mode setting unit 14 can set the guidance time POI display mode. As used herein, the term "guidance time POI display mode" refers to a mode in which a POI icon indicating a POI to be displayed is displayed with route guidance in the background. The words "with route guidance in the background" refer to a mode in which route guidance is given in the background so that switching to a route guidance mode (described below) can be selectively performed at any time. Switching to a display format in the route guidance mode may be triggered by a simple operation, such as a touch on the touch panel. In the guidance time POI display mode, the current location of the device moves along the guide route.

Figure 4:
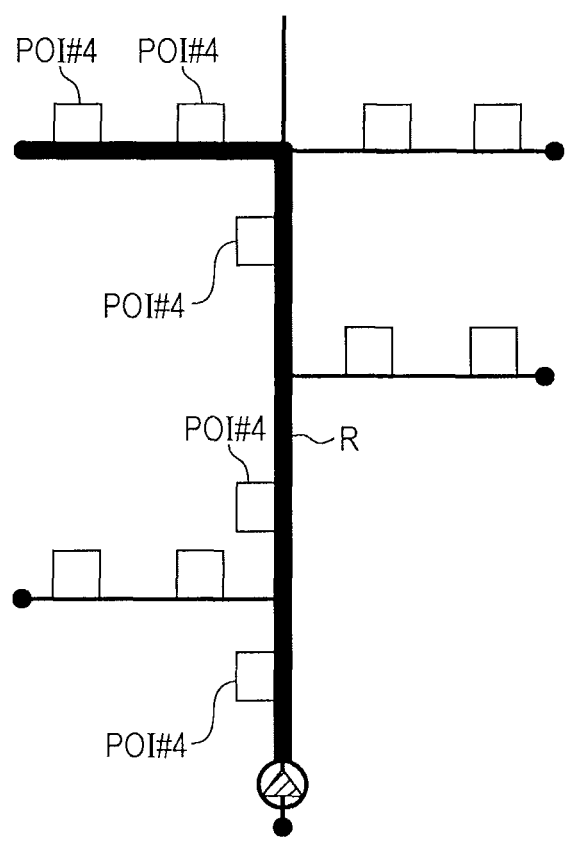
FIG. 4 illustrates POIs to be displayed when a guidance time POI display mode is set.
Figure 5:
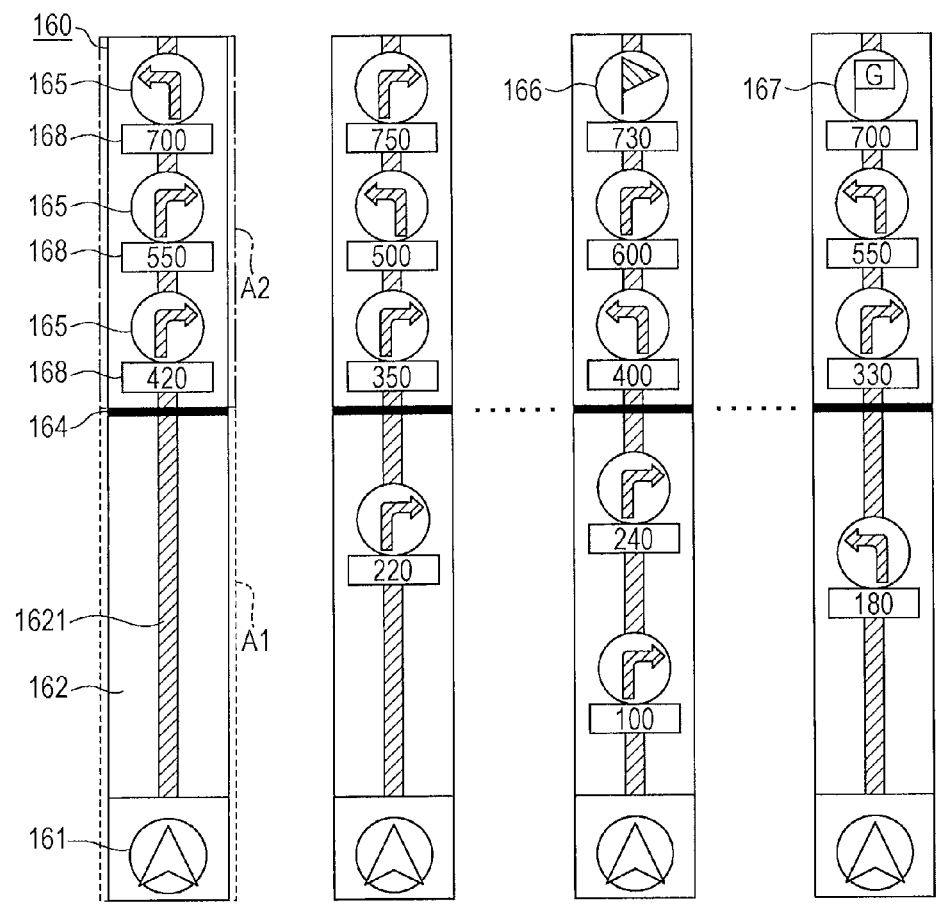
FIGS. 5A to 5D are examples of icons displayed in a route guidance mode.

When the guidance time POI display mode is set, the icon drawing sub-unit 112 generates drawing data of the POIs to be displayed on a guide route R (POI #4) in order to display the above-described icons in a linear fashion, as illustrated in FIG. 4.

In such a case, as in FIGS. 3A and 3B, an image 16 including the POI icon is displayed in the display area A.

Note that in the guidance time POI display mode, the icon may be displayed so as to be selectable using a one-touch operation performed on the touch panel. In such a case, the waypoint setting unit 9 may immediately select, as a waypoint through which the vehicle passes before the vehicle arrives at the guided destination, the POI to be displayed corresponding to the icon selected by the one-touch operation. As used herein, the term "immediately" means "without any other operation". In this case, after the route planning unit 7 re-plans the route, the route guidance unit 8 may start route guidance in the background so that the waypoint set by the route guidance unit 8 is passed through.

Figure 6:
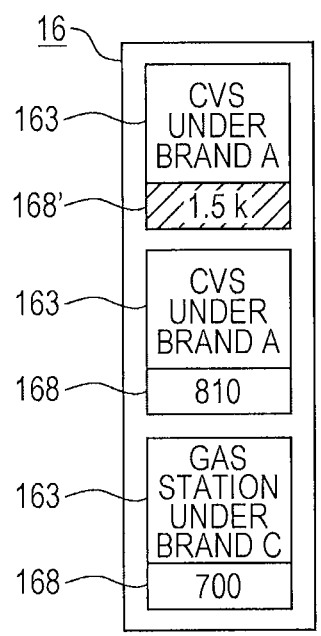
FIG. 6 is a schematic illustration of a display format of distance information corresponding to a POI to be displayed set as a waypoint.

In addition, as illustrated in FIG. 6, if a waypoint is set in this manner, the display format (e.g., the color of an image) of distance information 168' corresponding to a POI to be displayed that is not specified as a waypoint may be changed from that of the distance information 168 corresponding to the POI to be displayed that is specified as a waypoint.

Furthermore, after a waypoint is set in this manner, the icons 163 may be displayed so as to be selectable through a one-touch operation performed on the touch panel. In such a case, if the icon 163 of the POI to be displayed that is specified as a waypoint is selected again through a one-touch operation, the POI selected as a waypoint may be deselected.

In addition, as illustrated in FIG. 6, if a configuration in which the guidance time POI display mode is automatically set when the destination is set in the non-guidance time POI display mode is employed, the display format of the distance information corresponding to a POI to be displayed that is specified as a destination may be changed from that of the distance information corresponding to a POI to be displayed that is not specified as a destination. Furthermore, at that time, the icon of the POI to be displayed may be displayed so as to be selectable through a one-touch operation performed on the touch panel. In such a case, if the icon of the POI to be displayed that is specified as the destination is selected by a one-touch operation, the selection of the POI as the destination may be deselected. At that time, the non-guidance time POI display mode may be activated again.

Route Guidance Mode Setting

In addition, the display mode setting unit 14 can set a route guidance mode. In the route guidance mode, a screen for route guidance is displayed in the foreground.

When the route guidance mode is set, the icon drawing sub-unit 112 generates drawing data used for displaying guide point icons in a linear fashion. Note that the guide point icons indicate guide points on the guide route to be displayed.

In addition, when the route guidance mode is set, the icon drawing sub-unit 112 generates the drawing data used for displaying a destination icon indicating the destination on the guide route. Furthermore, if a waypoint is set, the icon drawing sub-unit 112 generates the drawing data used for displaying a waypoint icon indicating the waypoint on the guide route.

FIGS. 5A to 5D illustrate examples of an image 160 displayed in the display area A when the route guidance mode is set in a time series manner in accordance with the movement of the current location.

The image 160 illustrated in FIGS. 5A to 5D differs from the image 16 illustrated in FIGS. 3A and 3B in that the icons 163 of the POIs to be displayed as illustrated in FIGS. 3A and 3B are replaced with a guide point icon 165 indicating an intersection to be guided through and a waypoint icon 166 (refer to FIG. 5C) and a destination icon 167 (refer to FIG. 5D). However, the display processes of the images are substantially the same. Note that when the image 160 is displayed, voice guidance performed by the route guidance unit 8 may be offered for the guide points displayed in the first region A1.

Processing Performed in all Modes

Figure 7:
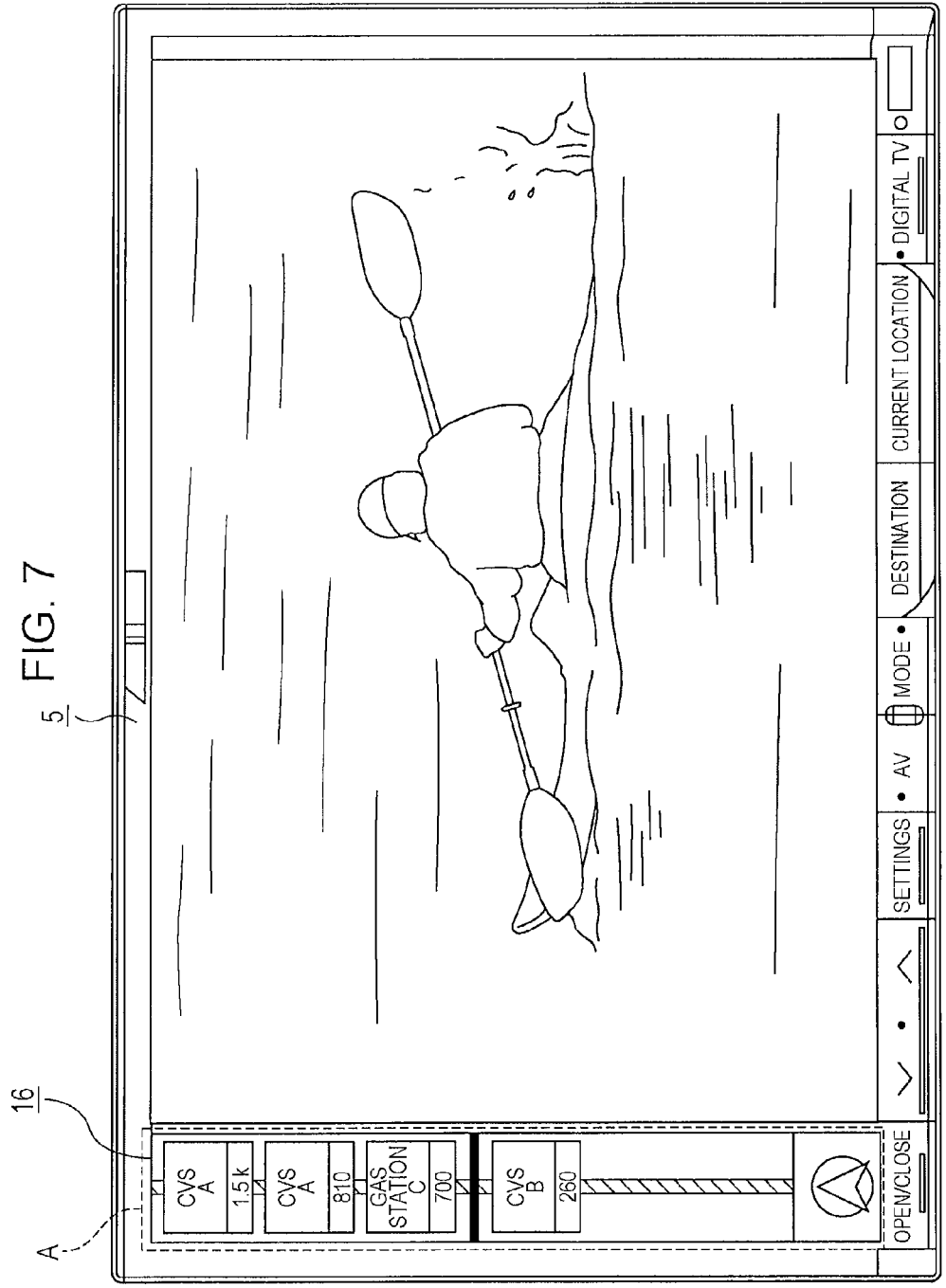
FIG. 7 illustrates an example of a screen layout according to an embodiment of the present invention.

When any one of the above-described three modes is set, the display area A for the image 16 (160) may be located at the end (e.g., the left end) of the entire display area of the display unit 5, as illustrated in FIG. 7.

In addition, in FIG. 7, an audio/visual screen is displayed in a display area other than the display area A. The screen illustrated in FIG. 7 may be displayed in response to a predetermined user operation performed on the audio/visual screen displayed as a full screen. Note that although the image 16 in the non-guidance time POI display mode is displayed in FIG. 7, the image 16 (a mode) displayed first after the full screen display mode of the audio/visual screen ends can be changed from the image 16 in the non-guidance time POI display mode in accordance with the presence/absence of destination setting or user selection as needed.

According to the above-described configuration, in any one of the above-described three modes, icons indicating display objects located on a road ahead of the current location in accordance with the set mode are displayed in the belt-like display area A in a linear fashion preferentially in order of proximity to the current location, and the icon of a display object located within a predefined distance from the current location can be movably displayed so as to move towards the current location in accordance with the movement of the current location. Accordingly, a simple display format of a navigation function suitable for each of the modes using a narrow display space can be achieved. In addition, by displaying a movable icon for a display object located close to the current location and displaying a stationary icon for a display object located farther from the current location, the user expects that a display object located close to the current location will come into view soon, unlike a display object located farther from the current location. Thus, a user can get a real-life impression.

In addition, since the icons of display objects can be displayed together with distance information indicating the distance from the current location to each display object, the reliability of the order of arrangement of the icons can be increased.

Furthermore, if, as described above, selection of a display object as a waypoint or a destination and de-selection of display object as a waypoint or a destination can be performed through a one-touch operation on a touch panel, the operability and usability can be increased.

Still furthermore, as illustrated in FIG. 6, by using a display format of the distance information 168' corresponding to the to-be-displayed POI selected as a waypoint or a destination and a display format of the distance information 168 corresponding to the other to-be-displayed POIs that differ from each other, the user can easily recognize the waypoint and the destination together with their distances. Accordingly, the usability can be increased more.

Yet still furthermore, if, as illustrated in FIG. 7, the display area A is set at the end of the entire display area, the other display information that previously has been displayed in full screen (e.g., an audio/visual screen) can be continuously displayed with little degradation of the visibility even though information regarding the navigation function is displayed.

Method for Displaying Icon and Navigation Program

A method for displaying an icon for use in the navigation device 1 and a navigation program according to the present exemplary embodiment are described next with reference to FIGS. 8 and 9.

Figure 8:
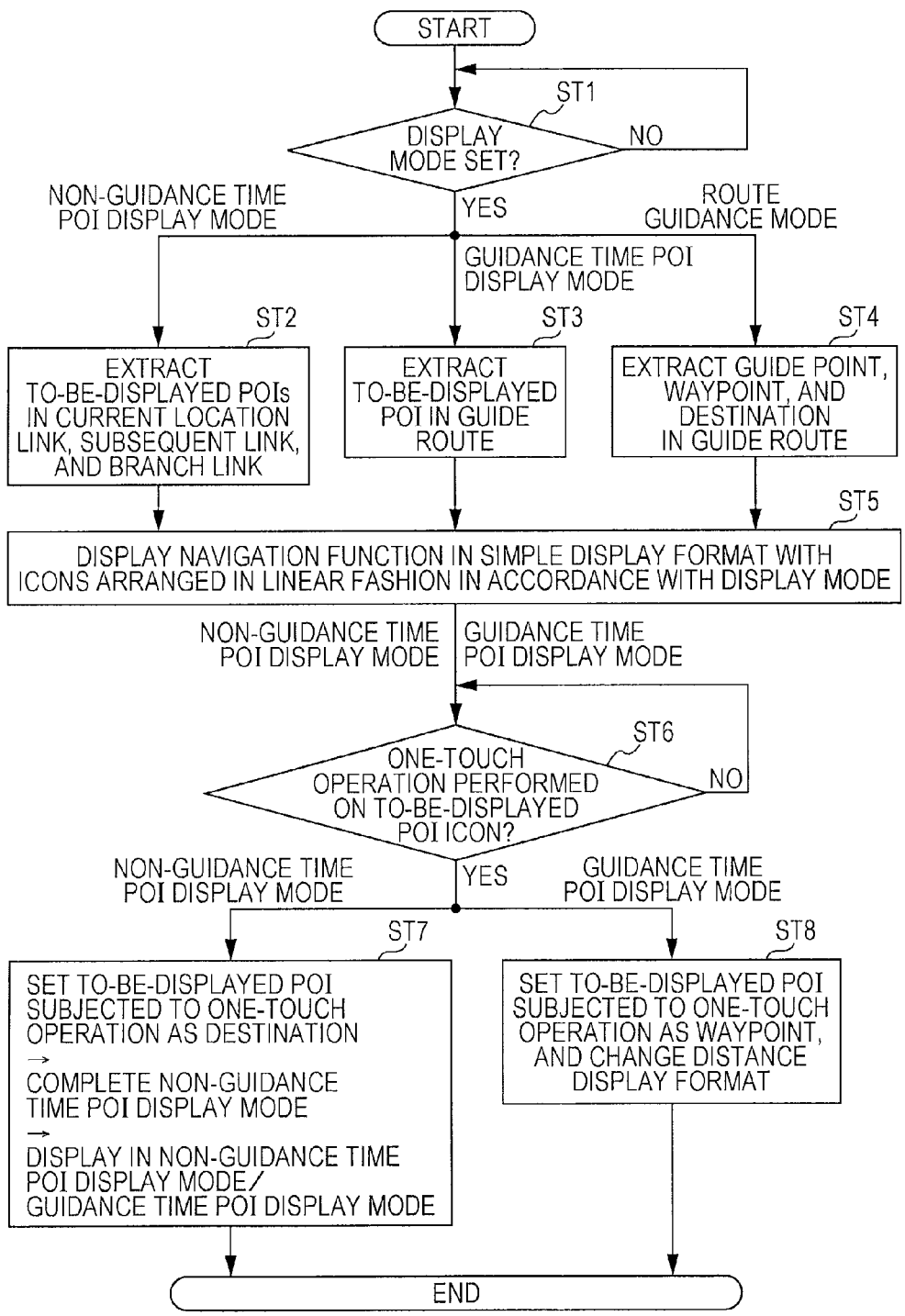
FIG. 8 is a flowchart of a method for displaying an icon and a navigation program according to an exemplary embodiment of the present invention.
Figure 9:
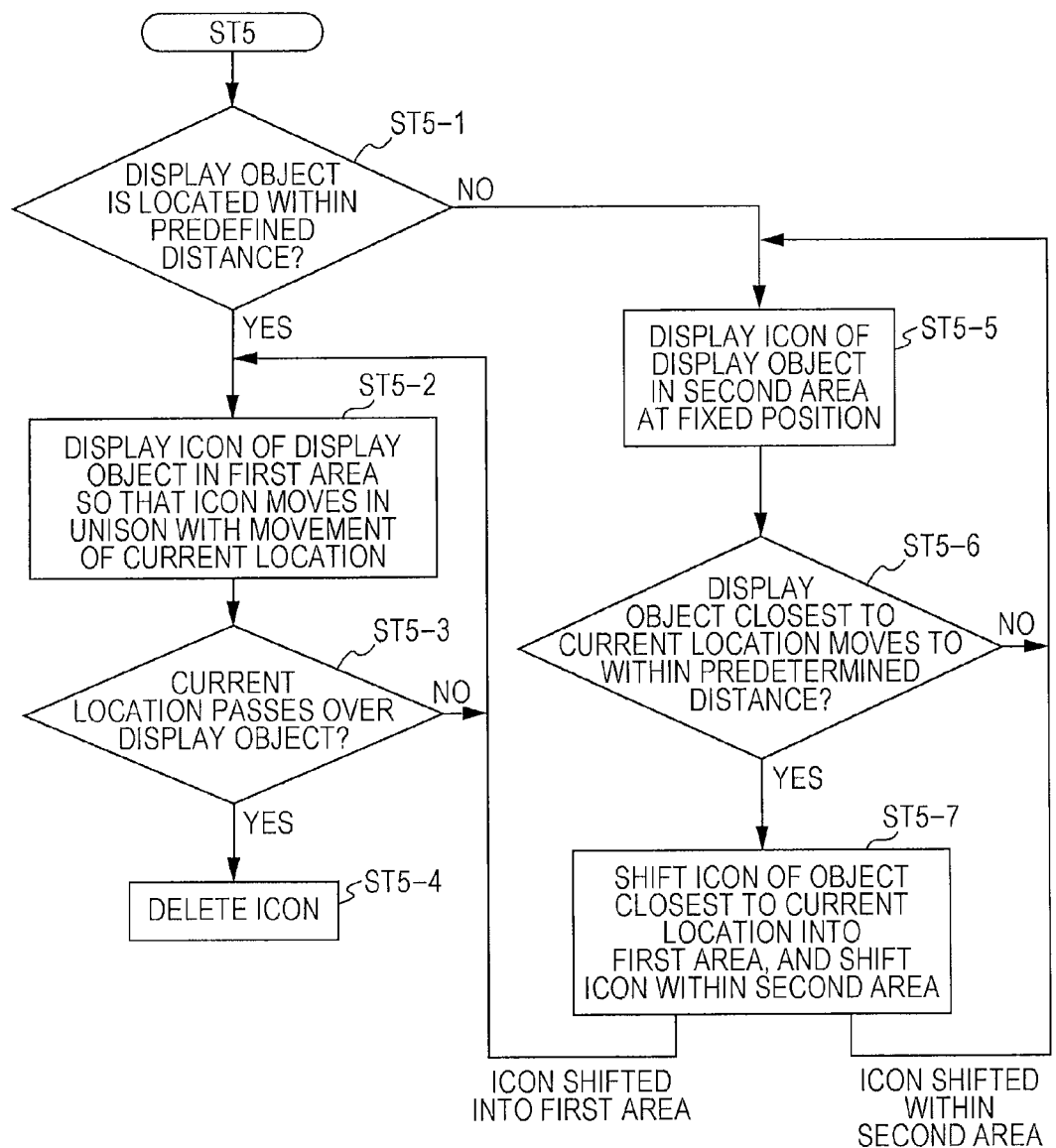
FIG. 9 is a flowchart illustrating a main process of FIG. 8 in detail.

FIGS. 8 and 9 illustrate the processing flow of the navigation program (application software) including the processing flow of displaying an icon.

Note that in an initial state, the display mode setting unit 14 does not set any one of the display modes.

In step 1 (ST1), the display object extracting sub-unit 111 determines whether the display mode setting unit 14 sets a display mode in the initial state. If the determination made in step 1 (ST1) is "Yes", the processing proceeds to one of step 2 (ST2) through step 4 (ST4) in accordance with the set display mode. That is, if the non-guidance time POI display mode is set, the processing proceeds to step 2 (ST2). If the guidance time POI display mode is set, the processing proceeds to step 3 (ST3). If the route guidance mode is set, the processing proceeds to step 4 (ST4). However, if the determination made in step 1 (ST1) is "No", the processing in step 1 (ST1) is repeated.

If the processing proceeds to step 2 (ST2), the display object extracting sub-unit 111 extracts POIs to be displayed on the current link, a subsequent link, and a branch link from the map data. Thereafter, the processing proceeds to step 5 (ST5).

If the processing proceeds to step 3 (ST3), the display object extracting sub-unit 111 extracts POIs to be displayed on the guide route from the map data. Thereafter, the processing proceeds to step 5 (ST5).

If the processing proceeds to step 4 (ST4), the display object extracting sub-unit 111 extracts guide points, waypoints, and the destination on the guide route from the map data. Thereafter, the processing proceeds to step 5 (ST5).

In step 5 (ST5), as illustrated in FIGS. 3A and 3B, FIGS. 5A to 5D, and FIG. 6, the icon drawing sub-unit 112 through the background drawing sub-unit 116 of the navigation function simple drawing unit 11 display the icons of the display objects extracted in accordance with the display mode in a linear fashion (display the navigation function in a simple display format). Note that if the number of the display objects extracted in step 2 (ST2) through step 4 (ST4) is limited in accordance with the size of the display area A, the processing in step 2 (ST2) through step 4 (ST4) and the processing in step 5 (ST5) can be repeated.

Subsequently, if the set mode is the non-guidance time POI display mode or the guidance time POI display mode, the navigation function simple drawing unit 11 determines whether a one-touch operation on an icon of a POI to be displayed is performed in step 6 (ST6). When the determination made in step 6 (ST6) is "Yes" and if the set mode is the non-guidance time POI display mode, the processing proceeds to step 7 (ST7). However, when the determination made in step 6 (ST6) is "Yes" and if the set mode is the guidance time POI display mode, the processing proceeds to step 8 (ST8). However, if the determination made in step 6 (ST6) is "No", the processing in step 6 (ST6) is repeated.

If the processing proceeds to step 7 (ST7), the destination setting unit 4 sets the to-be-displayed POI subjected to the one-touch operation as a destination. After the destination is set, the non-guidance time POI display mode is completed, and an image is displayed in one of the guidance time POI display mode and the route guidance mode.

If the processing proceeds to step 8 (ST8), the waypoint setting unit 9 sets the to-be-displayed POI subjected to the one-touch operation as a waypoint, and the display format of the distance information regarding the POI to be displayed is changed from the previous display format (refer to FIG. 6).

The process for displaying the icon of a display object in a simple display format of the navigation function performed in step 5 (ST5) is described next with reference to FIG. 9.

That is, to display the icon of a display object, in step 5-1 (ST5-1) illustrated in FIG. 9, the icon drawing sub-unit 112 determines whether the display object extracted by the display object extracting sub-unit 111 is located within the predefined distance for each of the extracted display objects. If the determination made in step 5-1 (ST5-1) for a display object is "Yes", the processing proceeds to step 5-2 (ST5-2). However, if the determination made in step 5-1 (ST5-1) for the display object is "No", the processing proceeds to step 5-5 (ST5-5).

The transition processing to step 5-2 (ST5-2) is described first. In step 5-2 (ST5-2), the icon drawing sub-unit 112 displays the icon of the display object at a position corresponding to the distance from the current location in the first region A1 (refer to, for example, FIGS. 3A and 3B) so that the icon moves towards the current location in accordance with the movement of the current location.

Subsequently, as indicated by step 5-3 (ST5-3), the icon drawing sub-unit 112 determines whether the current location passes the display object having the icon displayed in the first region A1. If the determination made in step 5-3 (ST5-3) is "Yes", the processing proceeds to step 5-4 (ST5-4), where the icon of the display object which the current location has passed is deleted from the screen. However, if the determination made in step 5-3 (ST5-3) is "No", the processing returns to step 5-2 (ST5-2).

In contrast, in step 5-5 (ST5-5), the icon drawing sub-unit 112 stationarily displays the icons of the display objects in the second region A2 (refer to, for example, FIGS. 3A and 3B) at positions corresponding to the distances from the current location.

Subsequently, in step 5-6 (ST5-6), the icon drawing sub-unit 112 determines whether the display object having an icon displayed in the second region A2 at a position closest to the current location moves within the predefined distance. If the determination made in step 5-6 (ST5-6) is "Yes", the processing proceeds to step 5-7 (ST5-7). However, if the determination made in step 5-6 (ST5-6) is "No", the processing returns to step 5-5 (ST5-5).

Subsequently, in step 5-7 (ST5-7), the icon drawing sub-unit 112 shifts the icon closest to the current location into the first region A1. In addition, the icon drawing sub-unit 112 shifts the icons in the second region A2 toward the current location by one icon display space. Thereafter, the processing for the icon shifted into the first region A1 proceeds to step 5-2 (ST5-2), and the processing for the icon shifted in the second region A2 proceeds to step 5-5 (ST5-5).

Figure 10:
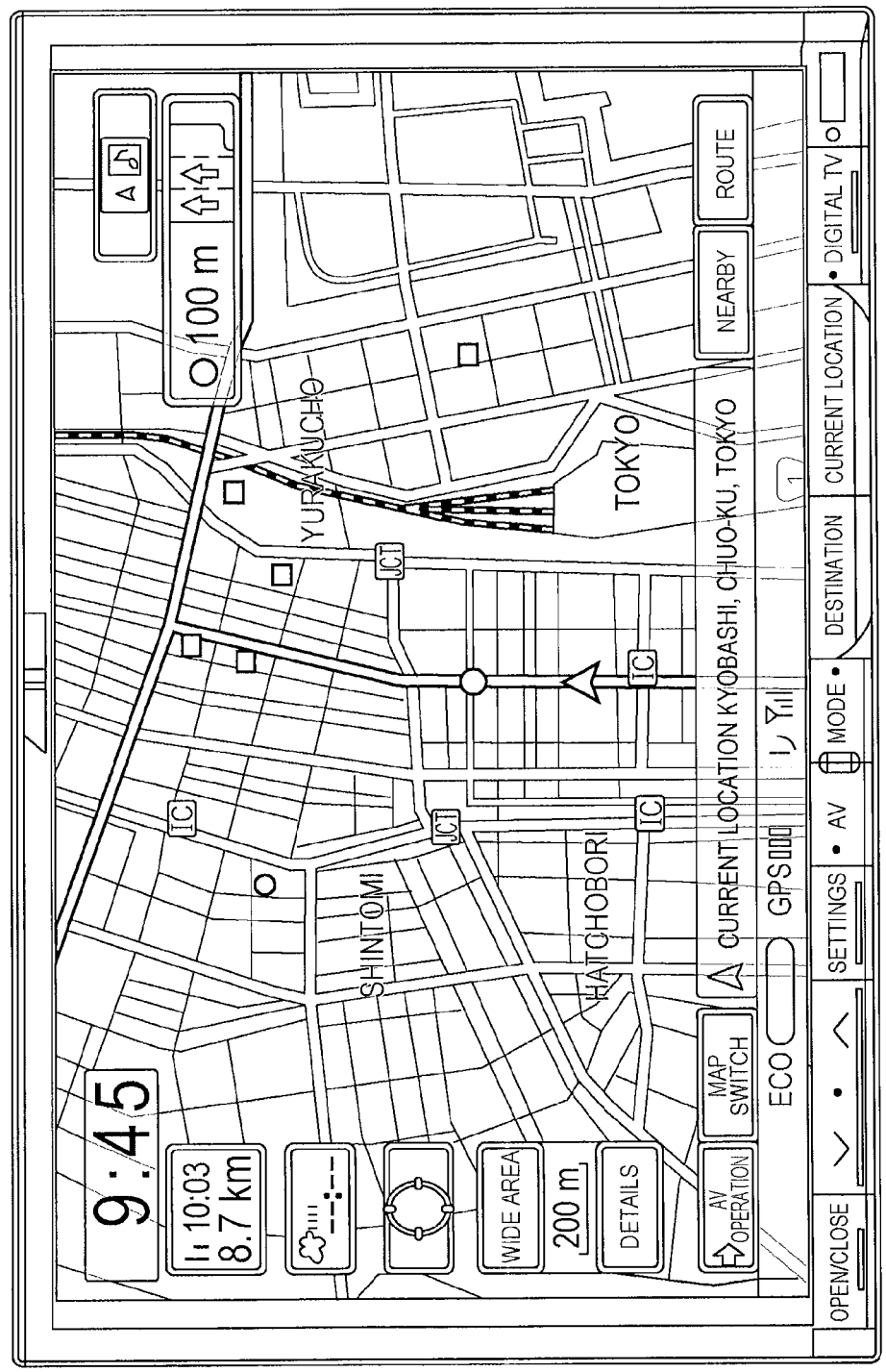
FIG. 10 illustrates a modified embodiment of the present invention.

The invention to is not limited to the described specific exemplary embodiments. For example, in response to a user operation, the navigation device 1 may display the details of the navigation function, such as displaying the detailed map or an enlarged view of an intersection, as illustrated in FIG. 10. In addition, the screen layout illustrated in FIG. 7 may be applied to an in-car rear entertainment system, a screen of a dual view for a front-seat passenger, or a screen of a cell phone. Furthermore, the present invention is applicable to any device having a small display area in addition to a device having a large screen illustrated in FIG. 7.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A navigation device for giving route guidance to a set destination comprising:
 a current location identifying unit configured to identify a current location;
 an icon display unit configured to display, on the basis of data regarding predetermined display objects located on a predetermined road ahead of the current location identified by the current location identifying unit, icons representing the display objects in a predetermined elongated display area of a display unit in a linear fashion along a length direction of the display area preferentially in order of proximity to the current location; and
 a predefined distance display unit configured to display an image indicating the predefined distance at a position corresponding to the predefined distance from the identified current location in the display area when the icons are displayed by the icon display unit,
 wherein the icon display unit stationarily displays the icons representing display objects located farther than the predefined distance from the current location in a region of the display area corresponding to a road range outside the predefined distance until one of the display objects closest to the current location moves to within the predefined distance in accordance with the movement of the current location, and
 wherein the icon display unit movably displays an icon representing a display object located within the predefined distance from the identified current location in a region of the display area corresponding to a road range within the predefined distance so that the icon moves towards the current location in accordance with the movement of the current location.

2. The navigation device according to claim 1, wherein the navigation device is capable of setting a non-guidance time POI display mode in which a POI icon indicating a POI set as a POI having an icon to be displayed is displayed on a background in which route guidance is not given, and
 wherein the icon display unit displays a POI icon representing a POI to be displayed on a current link having the current location therein, a POI icon representing a POI to be displayed on a subsequent link that follows the current link in a straight ahead direction, and a POI icon representing a POI to be displayed on a branch link which branches from a connection point of the current location link and the subsequent link or at a connection point of two neighboring subsequent links and located near the current location.

3. The navigation device according to claim 2, further comprising:
 a destination setting unit,
 wherein the icon display unit displays a POI icon so that the POI icon is selectable through a one-touch operation on a touch panel when the non-guidance time POI display mode is set, and
 wherein the destination setting unit sets a POI corresponding to the POI icon selected by the one-touch operation as the destination.

4. The navigation device according to claim 3, wherein if the POI icon corresponding to the POI set as the destination is again selected by the one-touch operation, the destination setting unit removes the setting that specifies the POI as the destination.

5. The navigation device according to claim 1, wherein the navigation device is capable of selectably setting a guidance time POI display mode in which a POI icon representing a POI having an icon to be displayed is displayed when route guidance is given in a background and a route guidance mode in which a route guidance screen is actually displayed,
 wherein the icon display unit displays a POI icon representing a POI to be displayed located on the guide route as the icon when the guidance time POI display mode is set, and
 wherein the icon display unit displays a guide point icon indicating a guide point located on the guide route as the icon when the route guidance mode is set.

6. The navigation device according to claim 5, wherein the icon display unit displays a destination icon representing the destination located on the guide route as the icon when the route guidance mode is set.

7. The navigation device according to claim 6, wherein the icon display unit displays a waypoint icon representing a waypoint located on the guide route as the icon when the route guidance mode is set.

8. The navigation device according to claim 5, further comprising:
 a waypoint setting unit,
 wherein if the guidance time POI display mode is set, the icon display unit displays a POI icon so that the POI icon is selectable through a one-touch operation on a touch panel, and
 wherein the waypoint setting unit sets a POI corresponding to the POI icon selected by the one-touch operation as a waypoint which is to be passed before the destination of the guide route is reached.

9. The navigation device according to claim 8, wherein if the POI icon corresponding to the POI set as the waypoint is again selected by the one-touch operation, the waypoint setting unit removes the setting that specifies the POI as a waypoint.

10. The navigation device according to claim 1, further comprising:
 a distance display unit configured to display distance information regarding a distance from the current location to the display object in association with the icon.

11. The navigation device according to claim 10, wherein the distance display unit changes a display format of the distance information corresponding to a display object set as one of the destination and a waypoint from a display format of the distance information corresponding to a display object that is set as neither a destination nor a waypoint.

12. The navigation device according to claim 1, further comprising:
 a current location display unit,
 wherein one end of the display area in a length direction of the display area corresponds to the current location, and the current location display unit displays a current location icon indicating the current location at the end of the display area.

13. The navigation device according to claim 1, wherein the display area is laced in an end portion of an entire display area of the display unit.

14. The navigation device according to claim 13, wherein when an audio/visual screen is displayed as a full screen and if a predetermined operation is performed, the icon display unit displays the icons in the display area set in the end portion of the audio/visual screen.

15. The navigation device according to claim 1, wherein the predefined distance display unit displays a line indicating the predefined distance such that the line extends in a direction perpendicular to the length direction of the display area.

16. A method for displaying an icon indicating a predetermined display object located on a road comprising:

a first step of identifying a current location; and a second step of displaying, on the basis of data regarding predetermined display objects located on a predetermined road ahead of the current location identified in the first step, icons representing the display objects in a predetermined elongated display area of a display unit in a linear fashion along a length direction of the display area preferentially in order of proximity to the current location and displaying an image indicating the predefined distance at a position corresponding to the predefined distance from the identified current location in the display area, wherein the second step further involves stationarily displaying the icons representing display objects located farther than the predefined distance from the current location in a region of the display area corresponding to a road range outside the predefined distance until a display object closest to the current location moves to within the predefined distance in accordance with the movement of the current location and movably displaying an icon representing a display object located within the predefined distance from the identified current location in a region of the display area corresponding to a road range within the predefined distance so that the icon moves towards the current location in accordance with the movement of the current location.

17. The method for displaying an icon according to claim 16, further comprising:

a third step of setting a non-guidance time POI display mode in which a POI icon representing a POI set as a POI having an icon to be displayed is displayed on a background in which the route guidance is not given, wherein the second step involves displaying a POI icon representing a POI to be displayed on a current link having the current location therein, a POI icon representing a POI to be displayed on a subsequent link that follows the current link in a straight ahead direction, and a POI icon representing a POI to be displayed on a branch link which branches from a connection point of the current location link and the subsequent link or at a connection point of two neighboring subsequent links and located near the current location.

18. The method for displaying an icon according to claim 17, wherein the second step involves displaying a POI icon so that the POI icon is selectable as the destination through a one-touch operation on a touch panel when the non-guidance time POI display mode is set.

19. The method for displaying an icon according to claim 18, further comprising:

a seventh step of displaying the POI icon corresponding to the POI set as the destination by the one-touch operation so that the POI icon is selectable by a new one-touch operation to remove the setting that specifies the POI as the destination.

20. The method for displaying an icon according to claim 16, further comprising:

a fourth step of selectably setting a guidance time POI display mode in which a POI icon representing a POI having an icon to be displayed is displayed when route guidance is given in a background, and a fifth step of selectively setting a route guidance mode in which a route guidance screen is actually displayed, wherein the second step includes a first sub-step of displaying a POI icon representing a POI to be displayed located on the guide route as the icon when the guidance time POI display mode is set and a second sub-step of displaying a guide point icon indicating a guide point located on the guide route as the icon when the route guidance mode is set.

21. The method for displaying an icon according to claim 20, wherein the second sub-step involves displaying a destination icon indicating the destination located on the guide route together with the guide point icon.

22. The method for displaying an icon according to claim 21, wherein the second sub-step involves displaying a waypoint icon indicating a waypoint located on the guide route together with the guide point icon.

23. The method for displaying an icon according to claim 20, wherein the first sub-step involves displaying a POI icon so that the POI icon is selectable as a waypoint through a one-touch operation on a touch panel.

24. The method for displaying an icon according to claim 23, further comprising:

a sixth step of displaying a POI icon corresponding to the POI set as the waypoint by a new one-touch operation so that the setting that specifies the POI as the waypoint is removable by a new one-touch operation.

25. A non-transitory recording medium storing:

a navigation program capable of giving route guidance to a set destination, the navigation program causing a computer to function as:

an icon display unit configured to display, on the basis of data regarding predetermined display objects located on a predetermined road ahead of a current location identified by a current location identifying unit, icons representing the display objects in a predetermined elongated display area of a display unit in a linear fashion along a length direction of the display area preferentially in order of proximity to the current location; and a predefined distance display unit configured to display an image indicating the predefined distance at a position corresponding to the predefined distance from the identified current location in the display area when the icons are displayed by the icon display unit, wherein the icon display unit stationarily displays the icons representing display objects located farther than the predefined distance from the current location in a region of the display area corresponding to a road range outside the predefined distance until one of the display objects closest to the current location moves to within the predefined distance in accordance with the movement of the current location, and wherein the icon display unit movably displays an icon representing a display object located within the predefined distance from the identified current location in a region of the display area corresponding to a road range within the predefined distance so that the icon moves towards the current location in accordance with the movement of the current location.

* * * * *